United States Patent [19]

Pool

[11] Patent Number: 4,563,280

[45] Date of Patent: Jan. 7, 1986

[54] SELF-CLEANING MUD PIT

[76] Inventor: James R. Pool, 402 Colorado St., Athens, Henderson County, Tex. 75751

[21] Appl. No.: 579,412

[22] Filed: Feb. 13, 1984

[51] Int. Cl.[4] .............................................. B01D 21/24
[52] U.S. Cl. ..................... 210/523; 210/513
[58] Field of Search ............... 209/451; 210/523, 534, 210/113, 267, 514, 515, 513

[56] References Cited

U.S. PATENT DOCUMENTS

| 676,328 | 6/1901 | Latta | 210/532.1 |
| 688,493 | 12/1901 | Stebbins | 210/113 |
| 1,800,605 | 4/1931 | Crowley et al. | 210/267 |
| 2,671,562 | 3/1954 | Bingman | 210/523 |
| 3,662,897 | 5/1972 | Huff | 210/523 |

FOREIGN PATENT DOCUMENTS

| 614612 | 12/1926 | France | 210/534 |
| 643883 | 5/1928 | France | 210/267 |
| 10701 | of 1904 | United Kingdom | 210/451 |
| 287044 | 9/1971 | U.S.S.R. | 210/513 |

Primary Examiner—Tim Miles
Attorney, Agent, or Firm—Jerry W. Mills; Gregory M. Howison

[57] ABSTRACT

A self-cleaning mud pit (10) includes a container (18) mounted on a base (12). Supporting brackets (14) and (16) are provided for attachment to hinges (20) and (22) mounted on the side of the container (18). The container (18) is operable to rotate about the hinges (20) and (22) to decant liquid contained therein. An inlet port (36) and an outlet port (38) are disposed on either end of the container (18) with the centers thereof coinciding with the rotational axis of the container (18). Rotation of the container (18) causes liquid to decant through the inlet and outlet ports without displacing the inlet and outlet ports from the rotational centers thereof. Hinged doors (40) and (44) are provided to selectively inhibit flow through the inlet port (36) and the outlet port (38) such that the contents thereof decant over the edge of the container (18).

10 Claims, 6 Drawing Figures

SELF-CLEANING MUD PIT

TECHNICAL FIELD

The present invention pertains in general to apparatus for separating solids from liquid and, more particularly, to apparatus utilized in separating solids and drilling waste from pumping fluid in a recirculating system.

BACKGROUND OF THE INVENTION

Drilling operations that circulate drilling fluids into the drill hole require some type of settling tank or treatment process to remove the drill cuttings from the drilling fluid prior to its recirculation into the drill hole. One method of removing the cuttings from the drilling fluid is to route the fluid to a receiving pit of sufficient capacity to allow the cuttings to settle out by gravity separation before the less dense fluid on the top thereof is let recirculated back into the drill hole. These receiving pits may be in the form of an earthen pit or a portable mud pit.

Construction of an earthen pit to receive the fluid mixture can be expensive and time consuming, and it must later be filled and stabilized before the site may be useful for other purposes. However, if a portable mud pit is utilized, it must be emptied using expensive pumps and such of drill cuttings periodically and when drilling is completed prior to transport. Usually when a smaller portable mud pit is used, emptying is accomplished with a shovel and requires time consuming manual labor. This presents some disadvantages since these portable receiving pits tend to be complex and costly or cumbersome and slow with only limited capacity.

In view of the above disadvantages and since drilling operations can proceed only as fast as cuttings are removed from the returning drilling fluid, there exists a need for an inexpensive and relatively simple self-cleaning mud pit for separating drill cuttings from the drilling fluid.

SUMMARY OF THE INVENTION

The present invention disclosed and claimed herein comprises an apparatus for separation of immicible fluids having different densities such as, for example, those that are pumped from a fluid source to a reservoir. The separation apparatus includes an open ended container for holding the fluids to allow separation thereof disposed for example, between the fluid source and a reservoir. The open ended container is rotatable about an axis to decant the contents therefrom. An inlet port and an outlet port are connected to the open ended container for allowing fluid to flow into the container from the source and to flow out from the container to the reservoir. However, less dense fluid can be removed directly from the container by suction pipe after separation for direct circulation. The inlet and outlet ports are disposed along the rotational axis of the container such that rotation of the container does not result in displacement of the inlet and outlet ports from the rotational axis of the container. A hydraulic member is provided for rotating the container about the axis to decant the contents therefrom.

In accordance with another embodiment of the present invention, a first and second valve is provided to selectively close off the inlet and outlet ports, respectively. The valves are operable to prevent flow of material from the inner portions of the container outward through the inlet and outlet ports. The rotational axis is disposed adjacent one edge of the open end of the container such that rotation of the container about the rotational axis allows less dense fluid to flow through the outlet port and the valves are operable to be placed over the inlet and outlet ports to selectively prevent flow of the separated fluid through the inlet and outlet ports. The more dense remaining fluid is then decanted over the edge of the open end of the container for disposal thereof.

In accordance with yet another embodiment of the present invention, a second container is provided that is rotatable about a second rotational axis. The second container has an inlet port and outlet port axially disposed about the rotation axis thereof to allow fluid to enter the second container and exit if need be the second container, respectively. The second container is disposed between the first container and other containers with their respective rotational axes such that the rotation of the first container allows the less dense fluids to flow into another container to prevent waste of the less dense fluid. When all of the less dense fluid is decanted from the first container to another container, the valves are shut and the first container is rotated to decant the higher density liquid therefrom for disposal thereof.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
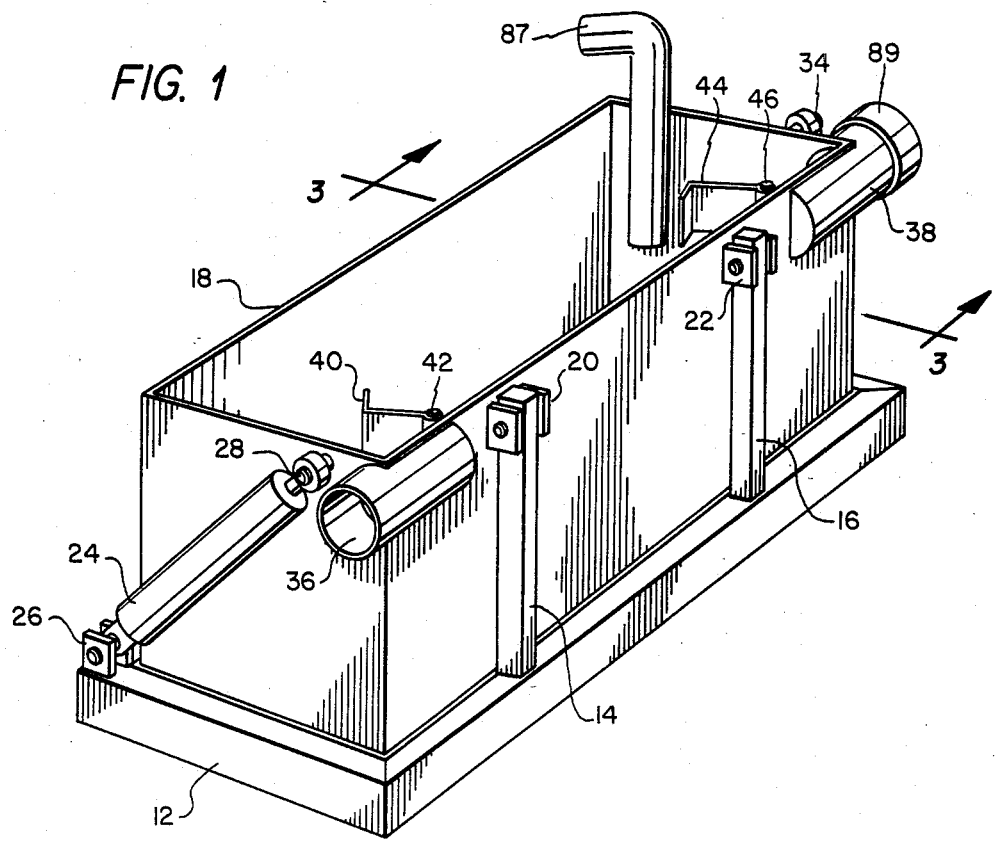
FIG. 1 illustrates a perspective view of a self-cleaning mud pit in accordance with the present invention.
Figure 2:
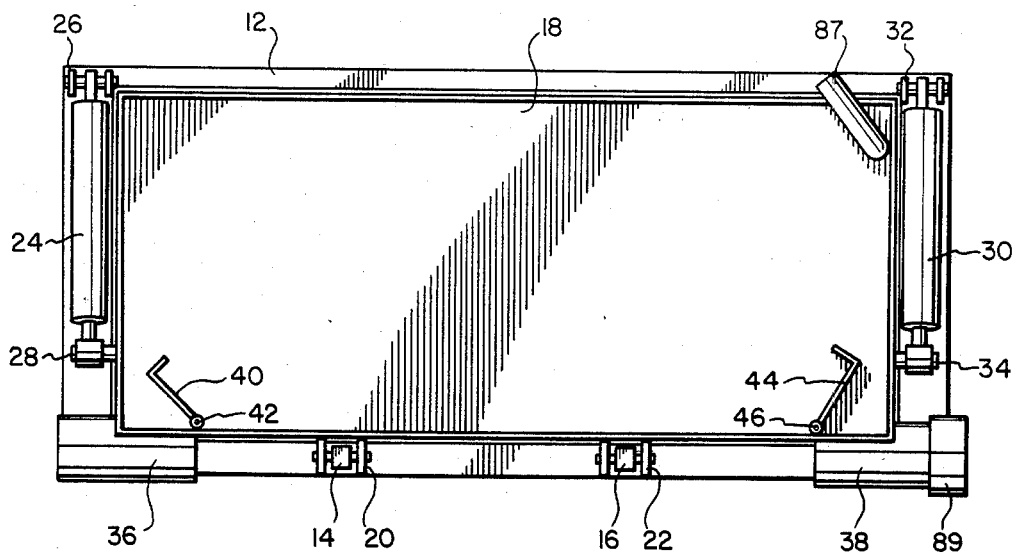
FIG. 2 illustrates a plan view of the mud pit showing the rotational brackets.

Referring now to FIGS. 1 and 2, there is illustrated perspective and plan views of a self-cleaning mud pit 10 in accordance with the present invention. The mud pit 10 includes a base 12 with a supporting bracket 14 and a supporting bracket 16 mounted thereon and extending vertically from the base 12. An open ended cuboidal container 18 is disposed on the base 12 and rotatably attached to the distal ends of the supporting brackets 14 and 16 by hinge brackets 20 and 22, respectively. The container 18 is operable to rotate about the hinge brackets 20 and 22 to tilt away from the base 12 such that contents contained therein are decanted towards the edge proximate the hinge brackets 20 and 22.

A hydraulic piston 24 has the cylinder end thereof mounted on a hinge point 26 on the base 12 and the reciprocating rod end thereof mounted on a hinge point 28 on the side of the container 18. A hydraulic piston 30 is mounted on the opposite side of the container 18 from the hydraulic piston 24 and has the cylinder end thereof attached to the hinge point 32 on the base 12 and the reciprocating rod end thereof attached to a hinge point 34 on the side of the container 18. The hinge points 28 and 34 on the sides of the container 18 are disposed a pre-determined distance away from the rotational axis of the container 18. In this manner, a moment arm is formed such that reciprocation of the hydraulic piston 24 and 30 results in rotation of the container 18 about the rotational axis.

An inlet port 36 is provided on one side of the container 18 for receiving fluid into the interior thereof and an outlet port 38 is disposed on the opposite end of the container 18 for allowing fluid contained in the container 18 to flow therefrom. The center lines of inlet port 36 and the outlet port 38 are alined with the rotational axis of the hinge points 20 and 22 which axis is also the rotational axis for the container 18. Therefore, rotation of the container 18 does not result in displacement of the rotational centers of the inlet port 36 and outlet port 38 from the rotational axes thereof. In this manner, tubing connected thereto can be rigid and fixed with respect to the base 12, resulting in lower costs and ease of assembly. In the event that it is required to remove fluid directly from the container 18, a cap 89 is disposed over the outlet port 38 to close off exit of fluid and a suction pipe 87 is utilized.

A door 40 is rotatedly mounted on a hinge 42 proximate the opening of the inlet port 36 into the container 18. A door 44 is rotatedly mounted on a hinge 46 proximate the outlet port 38. The doors 40 and 44 are operable to be disposed over the openings of the inlet port 36 and the outlet port 38, respectively, to prevent fluid and particulate matter disposed in the interior of the container 18 from flowing outward through either the inlet port 36 or the outlet port 38. The doors 40 and 44 in the preferred embodiment are manually operated. However, it should be understood that these doors can be remotely automatically operated.

Figure 3:
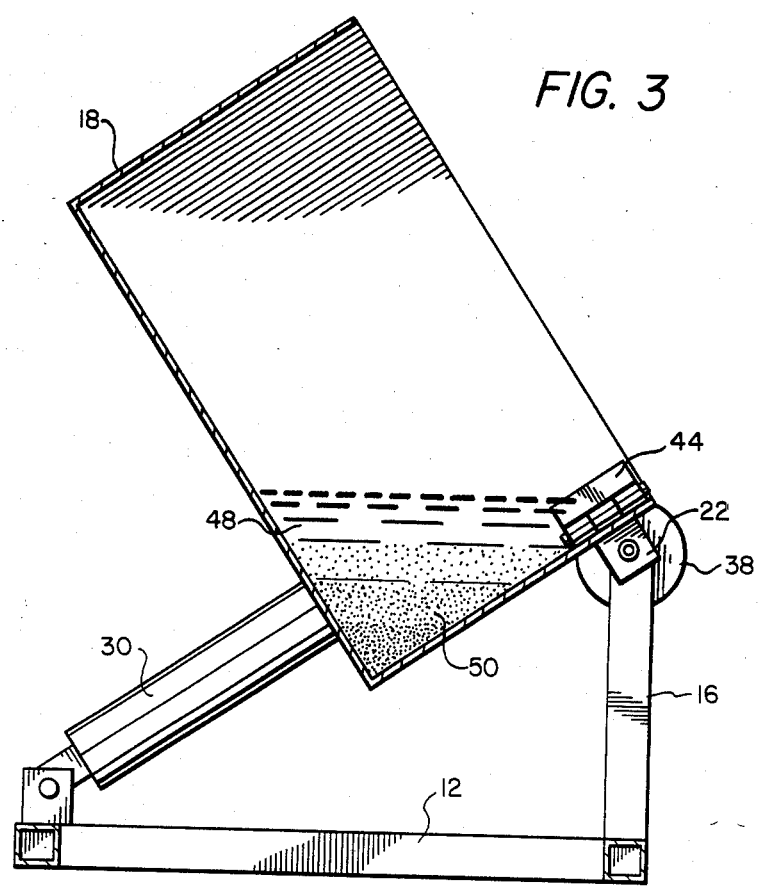
FIG. 3 illustrates a sectional view taken along lines 3—3 of FIG. 1 showing the mud pit in a tilted position.

Referring now to FIG. 3, there is illustrated a sectional view of the container 18 taken along lines 3—3 of FIG. 1. Pumping fluid 48 and drill cuttings 50 are disposed in the container 18 with the drill cuttings "settled out" from the pumping fluid 48. Since the pumping fluid 48 has a lower density than the drill cuttings 50, the pumping fluid 48 will always be above the drill cuttings 50. As illustrated, the hydraulic members 30 and 24 are in the extended position such that the container 18 is rotated about the hinge points 20 and 22. In this manner, the fluid 48 is decanted toward the outlet port 38. Since the opening to the outlet port 38 is lower than the open edge of the container 18, the fluid flows through the outlet port 38. Further extension of the hydraulic cylinders 24 and 30 decants all of the fluid 48 through the outport 38.

When substantially all of the fluid 48 has passed out through the outlet port 38, the door 44 is closed to prevent the drill cuttings 50 from passing through the outlet port 38, and the door 40 is also closed to prevent passage of the drill cuttings through the inlet port 36. Once the doors 40 and 44 are closed, the container 18 can be rotated further to dump the drill cuttings 50 over the open edge of the container 18 for disposal thereof. By tilting of the container 18 with the fluid 48 and drill cuttings 50 disposed therein and selectively operating the doors 40 and 44, the fluid 48 can be retained in the system and the drill cuttings 50 can be disposed of without requiring manual scooping.

Figure 4:
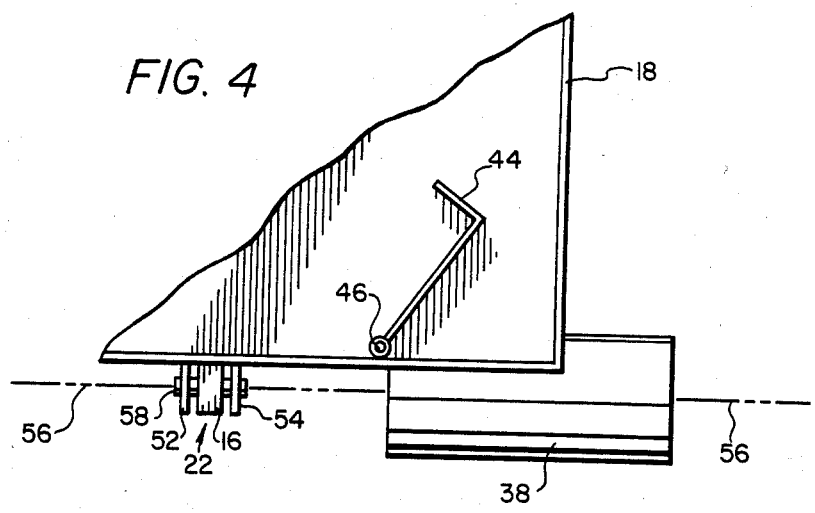
FIG. 4 illustrates an expanded view of the outlet port on the mud pit.

Referring now to FIG. 4, there is illustrated an expanded top view of the outlet port 38, the door 44 and the hinge point 22. The hinge 22 includes a bracket 52 and a bracket 54. The brackets 52 and 54 have a hole disposed therein alined with the rotational axis of the container 18. For illustrative purposes, the rotational axis is illustrated with a center line 56. A pin 58 is disposed through the holes in the brackets 52 and 54 and through a hole (not shown) in the end of the supporting bracket 16. The pin 58 allows for rotation of the container 18 on the end of the supporting bracket 16. The center line 56 passes through the center of the outlet port 38 which is cylindrical in shape. Therefore, rotation of the container 18 about the center line 56 results only in rotational motion of the outlet port 38. In this manner, a rigid tube can be disposed on the outlet port 38 with a slidable connection there between. Since rotation of the outlet port 38 does not result in any displacement away from the center line 56, decanting of fluids out of the container 18 does not affect the tubing or connections external to the container 18.

Figure 5:
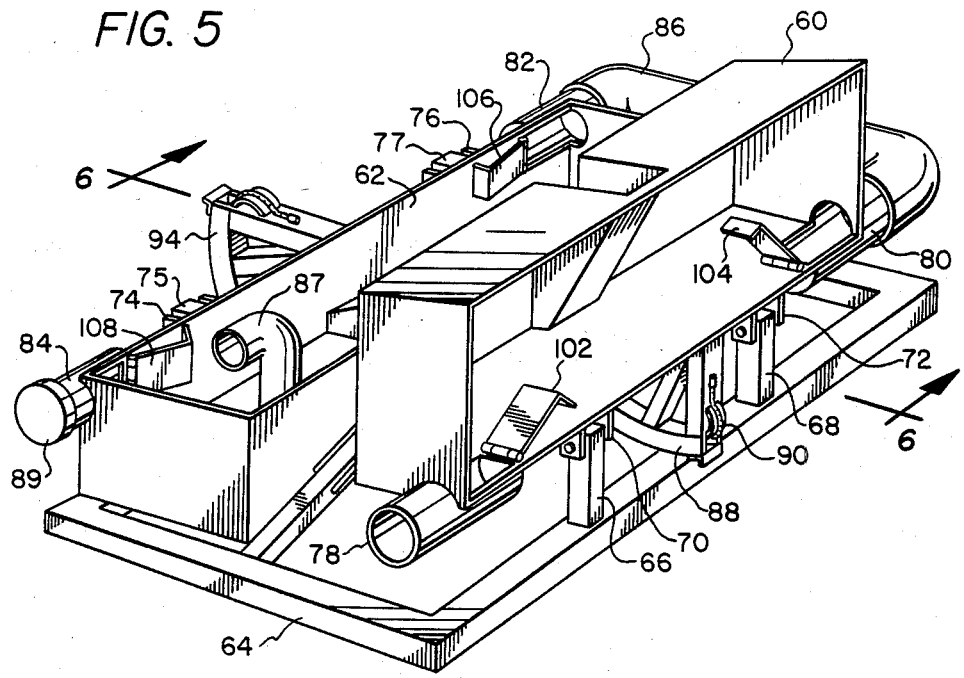
FIG. 5 illustrates a perspective view of a second embodiment in accordance with the present invention.

Referring now to FIG. 5, there is illustrated an alternate embodiment of the present invention. A container 60 and a second container 62 are mounted on a base 64. Supporting brackets 66 and 68 are mounted on the base 64 and are similar to the supporting brackets 14 and 16 of FIG. 1. The containers 60 and 62 are similar to the container 18 of FIG. 1. The supporting brackets at 66 and 68 are attached to hinges 70 and 72, respectively. The container 62 has hinges 74 and 76 attached thereto for rotation thereabout. Supporting brackets 75 and 77 are attached to the base 64 and to the hinges 74 and 76, respectively, for rotation of the container 62.

The container 60 has an inlet port 78 and an outlet port 80. The container 62 has an inlet port 82 and an outlet port 84. As described above with reference to FIG. 1, the inlet ports 78 and 82 and the outlet ports 80 and 84 have the center lines thereof coinciding with the rotational axis of the respective one of the containers 60 or 62. Therefore, rotation of the respective one of the containers 60 or 62 does not result in displacement of the inlet or outlet ports from the rotational axis. The outlet port 80 of the container 60 is connected to the inlet port 82 of the container 62 by an interconnecting tube 86 having slideable connectors at each end. In this configuration, fluid exiting the container 60 must pass through the container 62 before exiting through the outlet port 84 or removal by a suction pipe 87 disposed in the container 62. A cap 89 is disposed over the outlet port 84 to close off exit of fluid from container 62 in the event the suction pipe 87 is utilized. The inlet port 78 is connected to a fluid source and the outlet port 84 illustrated as closed by cap 89 is connected to a reservoir as, for example, another container if need be.

A sector 88 is disposed on the side of the container 60 adjacent the supporting brackets 66 and 68. The sector 88 traverses approximately 90 degrees with the arcuate surface thereof facing away from the container 60. The radial center of the sector 88 is disposed proximate the rotational axis of the container 60 and the plane of the sector 88 is perpendicular to the rotational axis of the container 60.

A cord 90 has one end thereof connected to a point on the perimeter of the sector 88 in the plane of the open surface of the container 60 and the remaining portion thereof disposed therealong. The other end of the cord 90 is connected to one end of a hydraulic cylinder 92 (not shown in FIG. 5) that is free to move above the base 64. The hydraulic cylinder 92 is operable to retract the cord 90 downward towards the base 64 to rotate the container 60. A sector 94 is disposed on the container 62 and is identical in operation to the sector 88, as will be described hereinbelow.

Figure 6:
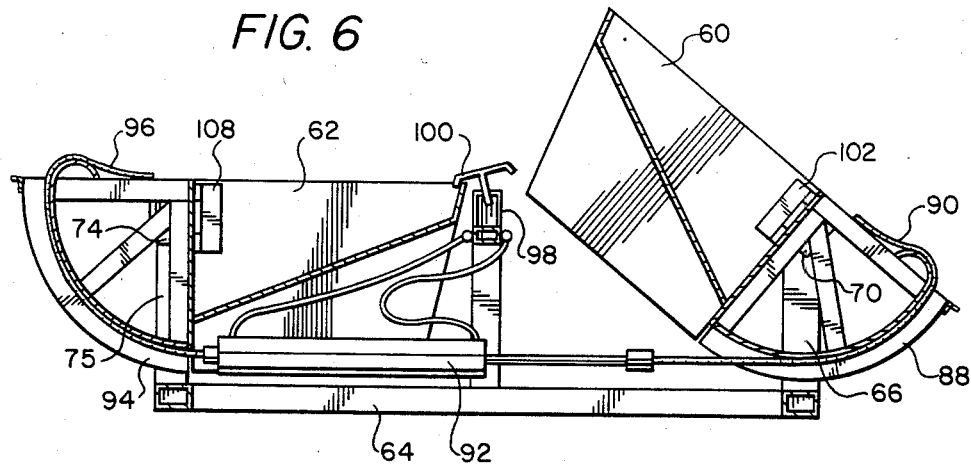
FIG. 6 illustrates a sectional view taken along lines 6—6 of FIG. 5.

Referring now to FIG. 6, there is illustrated a sectional view of the apparatus of FIG. 5 taken along line 6—6. The hydraulic cylinder 92 is illustrated as being free to move above the base 64 being held in place by tension on each end from cords 90 and 96 attached to opposite ends of the cylinder 92. By allowing the cylinder 92 to move freely the containers 60 and 62 can be dumped alternately of their contents by the action of only the one cylinder 92. A cord 96 has one end thereof attached to the other end of the hydraulic cylinder 92 with the length thereof disposed adjacent the perimeter of the sector 94. The other end of the cord 96 is attached to a point on the perimeter of the sector 94 in the plane of the open surface of the container 62.

A hold down chain 98 has one end thereof attached to the base 64 and the other end thereof operable to be attached to a point on the side of either the container 62 or the container 60 diametrically opposite respective the rotational axes thereof. When the chain 98 is connected to either the container 60 or the container 62, rotation thereof is prevented. As illustrated, the chain 98 is attached to the container 62 on a point 100. In this manner, the hydraulic cylinder 92 uses the cord 96 as an anchor when retracting the cord 90 to rotate the container 60. When the chain 98 is attached to the container 60, the cord 90 acts as an anchor and retraction of the cord 96 is permitted to rotate the container 62.

In operation, fluid mixed with drill cuttings is input to the inlet port 78 to fill the container 60. When the container 60 is filled, fluid exits the outlet port 80 and flows through the interconnecting tube 86 to enter the container 62 through the inlet port 82. Upon filling of the container 62, fluid exits the outlet port 84 except that fluid may be removed as desired by other means such as the suction pipe 87. Since a finite time is required to completely fill either of the containers 60 or 62 and flow velocity is reduced in the containers 60 or 62, a substantial amount of settling occurs in the container 60. Therefore, the percentage of drill cuttings that flows through the interconnecting tube 86 is small. However, for that portion of the drill cuttings that flows through the interconnecting tube 86, settling out is achieveable in the container 62. When the suction pipe 87 utilized to remove fluid from container 62 during drilling operations, the volume of drill cutings held in container 60 is about the same as the volume of fluid reduction experienced by container 62 as drilling progresses unless loss of fluid in the drill hole or spillage occurs. Thus, the volume of fluid to be transferred can be small or none. Upon rotation of the container 60, the fluid contained therein passes through the interconnecting tube 86 to the container 62 for storage thereof. To prevent the drill cuttings from flowing through the inlet port 78 and the outlet port 80, a hinge door 102 and a hinge door 104 are provided to cover the inlet port 78 and the outlet port 80, respectively. The container 62 has a hinge door 106 for covering the outlet port 82 and a hinge door 108 for covering the outlet port 84. Cleaning of container 62 is accomplished in a manner similar to container 60, as described above, and following cleaning of container 60.

In summary, there has been provided a mud pit container that is open ended and is rotatable about a rotational axis. The rotational axis coincides with an edge of the open end thereof. Inlet and outlet ports are disposed at either end of the container with the centers thereof coinciding with the rotational axis. Rotation of the container with the rotational axis does not displace the inlet and outlet ports from the rotational centers thereof. In this manner, rigid interconnecting tubing can be utilized. When a combined fluid and drill cutting mixture enters the container, separation thereof results in a relatively low density fluid and relatively high density fluid heavy with less dense drill cuttings. The fluid is decanted through the outlet port by rotation of the container about its rotational axis. When the fluid has been decanted, doors are disposed over the openings to the inlet and outlet ports and the drill cuttings and waste fluid are decanted over the edge of the container.

Although the preferred embodiment has been described in detail, it should be understood that various changes, substitutions and alterations can be made therein without departing from the spirit and scope of the invention as defined by the appended claims.

What is claimed is:

1. Apparatus for separation of immiscible fluids having different densities that are transferred from a fluid source comprising:
   an open ended container disposed after a fluid source for holding the fluids and rotatable about an axis to decant the contents thereof;
   inlet means connected to said container for allowing a flow of fluid into said container from the fluid source;
   outlet means connected to said container for allowing flow of fluid from said container to an external reservoir;
   said container being cuboidal in shape and the rotational axis thereof being proximate the open end thereof and adjacent a cuboidal edge of said container such that rotation of said container decants fluid through said outlet means;
   said inlet and outlet means disposed along the rotational axis of said container such that rotation of said container does not result in displacement of said inlet and outlet means; and
   means for rotating said container about its rotational axis to decant the fluids therefrom.

2. The apparatus of claim 1 and further comprising means for sealing said inlet and outlet means to prevent flow from said container during rotation of said container about the rotational axis thereof.

3. The apparatus of claim 1 wherein said means for rotating comprises a hydraulic cylinder disposed perpendicular to a moment arm attached to said container with respect to said rotational axis such that reciprocation of said hydraulic member causes rotation of said container aobut the rotational axis thereof.

4. Apparatus for separating immiscible fluids having different densities that are pumped from a source location comprising:
   a base member;
   a first open end container mounted on said base and pivotable about a first rotational axis, the first rotational axis disposed along one edge of the open end thereof;
   said container having an inlet port for allowing the fluid to enter said container and an outlet port for allowing fluid to flow from said container when the fluid level therein rises above said outlet port;
   said inlet and said outlet ports centered about said first rotational axis such that rotation of said container does not displace the centers of said inlet and outlet ports with respect to said first rotational axis;

a first length of tubing connected between the fluid source and said inlet port, said tubing allowing free rotation of said first container about said first rotational axis;

a length of outlet tubing connected between said outlet port and an external reservoir, said outlet tubing allowing free rotation of said first container about said first rotational axis;

means for rotating said first container about the first rotational axis to decant liquid therein through said outlet port to the external reservoir; and valve means for sealing off said inlet and outlet ports to prevent flow therethrough to force fluid to decant over the open edge of said first container when said first container is rotated about said first rotational axis.

5. The apparatus of claim 4 wherein said first open ended container is cuboidal in shape.

6. The apparatus of claim 4 wherein said means for rotating comprises a hydraulically actuated piston member having one end thereof attached to said base member and the other end thereof attached proximate the open end of said container diametrically opposite said first rotational axis to provide a motive force perpendicular to the rotational axis.

7. The apparatus of claim 4 wherein said means for rotating comprises:

a sector-shaped member disposed adjacent said first container and having the radial center thereof disposed proximate the open edge of said first container and coinciding with said first rotational axis;

a cord member having one end thereof attached to a point of the radial perimeter of said sector member and disposed along the radial perimeter thereof; and a reciprocating member having one end thereof attached to said base and the other end thereof attached to the other end of said cord, said reciprocating member operable to apply a force to said cord such that said force is translated to said sector member resulting in a force perpendicular to the radial center of said sector member.

8. The apparatus of claim 4 and further comprising:

a second open ended container mounted on said base and pivotable about a second rotational axis, the second rotational axis coinciding with one edge of the open end thereof;

said second container having an inlet port for allowing fluid to flow into said second container and an outlet port for allowing fluid to flow from said second container;

a cap for closing the outlet port;

a length of rigid interconnection tubing connected between the inlet port of said second container and the outlet port of said first container;

said length of outlet tubing connected between the outlet port of said second container and the external reservoir, means for rotating said second container about said second rotational axis; and valve means for selectively closing off the inlet and outlet ports of said second container to prevent flow of fluids from the interior of said second container through said inlet and outlets ports.

9. The apparatus of claim 4 wherein said valve means comprises first and second pivoting members mounted on the interior of said first container proximate said inlet and outlet ports, respectively, said first and second pivoting members operable to cover said inlet and outlet ports for blockage thereof.

10. The apparatus of claim 9 wherein said pivoting members are manually operated.

* * * * *

UNITED STATES PATENT AND TRADEMARK OFFICE
CERTIFICATE OF CORRECTION

PATENT NO. : 4,563,280
DATED : January 7, 1986
INVENTOR(S) : James R. Pool

It is certified that error appears in the above-identified patent and that said Letters Patent is hereby corrected as shown below:

Claim 3, line 49, "monent arm" should be --moment arm--;
Claim 3, line 52, "aobut" should be --about--.

Signed and Sealed this

Fifteenth Day of April 1986

[SEAL]

Attest:

DONALD J. QUIGG

Attesting Officer

Commissioner of Patents and Trademarks